(12) United States Patent
Kang

(10) Patent No.: US 12,024,168 B2
(45) Date of Patent: Jul. 2, 2024

(54) VEHICLE FOR TRACKING SPEED PROFILE AND CONTROL METHOD THEREOF

(71) Applicants: HYUNDAI MOTOR COMPANY, Seoul (KR); KIA CORPORATION, Seoul (KR)

(72) Inventor: Dong Hoon Kang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 322 days.

(21) Appl. No.: 17/731,656

(22) Filed: Apr. 28, 2022

(65) Prior Publication Data

US 2022/0396264 A1 Dec. 15, 2022

(30) Foreign Application Priority Data

Jun. 11, 2021 (KR) .......................... 10-2021-0076183

(51) Int. Cl.
*B60W 30/14* (2006.01)
*B60W 50/00* (2006.01)

(52) U.S. Cl.
CPC .......... *B60W 30/143* (2013.01); *B60W 50/00* (2013.01); *B60W 2050/0022* (2013.01); *B60W 2520/105* (2013.01); *B60W 2720/103* (2013.01)

(58) Field of Classification Search
CPC .............. B60W 30/143; B60W 50/00; B60W 2050/0022; B60W 2520/105; B60W 2720/103
See application file for complete search history.

(56) References Cited

U.S. PATENT DOCUMENTS

| | | | | |
|---|---|---|---|---|
| 9,070,289 | B2 * | 6/2015 | Saund | G08G 1/0175 |
| 9,870,002 | B1 * | 1/2018 | Holmberg | G05D 1/0223 |
| 2015/0298689 | A1 * | 10/2015 | Schwartz | B60W 20/20 |
| | | | | 903/904 |
| 2017/0015318 | A1 * | 1/2017 | Scofield | G08G 1/07 |

* cited by examiner

*Primary Examiner* — Gertrude Arthur Jeanglaude
(74) *Attorney, Agent, or Firm* — MCDONNELL BOEHNEN HULBERT & BERGHOFF LLP

(57) ABSTRACT

A vehicle includes a speed profile generating device that generates a speed profile indicating an expected speed change of a vehicle with respect to a unit time, based on a current driving state of the vehicle, a time point selecting device that selects a target time point, a first time point earlier than the target time, and a second time point later than the target time point from the speed profile, a tracking acceleration generating device that generates a tracking acceleration for tracking the speed profile based on the target time point, the first time point, the second time point, and the speed profile, and a controller module that controls a driving state of the vehicle based on the tracking acceleration.

20 Claims, 11 Drawing Sheets

| Automation level | SAE classification reference | Roles of system | Roles of driver |
|---|---|---|---|
| LEVEL 0 | No automation | Temporary emergent intervention or provision of warning | Perform all driving functions by driver |
| LEVEL 1 | Driver Assistance | Perform some driving functions such as steering and acceleration/deceleration together while driver who performs driving function in normal operation section is on board | Determine operation/timing of level 1 system and perform all operations except for manipulation of handle or acceleration/deceleration pedal (including monitoring of driving environment/driving of vehicle/level 1 system and instantaneous measure for emergent situation) |
| LEVEL 2 | Partial autonomous driving | Perform driving functions such as steering and acceleration/deceleration instead of driver while driver who monitors steering and acceleration/deceleration devices | Determine operation/timing of system and perform all operations except for manipulation of handle or acceleration/deceleration pedal (including monitoring of driving environment/driving of vehicle/level 2 system and instantaneous measure for emergent situation) |
| LEVEL 3 | Conditional autonomous driving | Transfer driving control right to driver in situations other than condition, and perform driving functions such as steering and acceleration/deceleration | Determine operation/timing of system and perform all operations except for manipulation of handle or acceleration/deceleration pedal (including monitoring of driving environment/driving of vehicle/level 2 system and instantaneous measure for emergent situation) |
| LEVEL 4 | High autonomous driving | Perform all driving functions while driver is on board, except for extremely exceptional situation | May selectively perform measure for emergency situation when transfer of control right of level 4 system is requested |
| LEVEL 5 | Full autonomous driving | Perform all driving functions which system may cope with without any driver | Determine only whether system is to be operated and do not perform all driving operations |

| Automation level | SAE classification reference | Roles of system | Roles of driver |
|---|---|---|---|
| LEVEL 0 | No automation | Temporary emergent intervention or provision of warning | Perform all driving functions by driver |
| LEVEL 1 | Driver Assistance | Perform some driving functions such as steering and acceleration/deceleration together while driver who performs driving function in normal operation section is on board | Determine operation/timing of level 1 system and perform all operations except for manipulation of handle or acceleration/deceleration pedal (including monitoring of driving environment/driving of vehicle/level 1 system and instantaneous measure for emergent situation) |
| LEVEL 2 | Partial autonomous driving | Perform driving functions such as steering and acceleration/deceleration instead of driver while driver who monitors steering and acceleration/deceleration devices | Determine operation/timing of system and perform all operations except for manipulation of handle or acceleration/deceleration pedal (including monitoring of driving environment/driving of vehicle/level 2 system and instantaneous measure for emergent situation) |
| LEVEL 3 | Conditional autonomous driving | Transfer driving control right to driver in situations other than condition, and perform driving functions such as steering and acceleration/deceleration | Determine operation/timing of system and perform all operations except for manipulation of handle or acceleration/deceleration pedal (including monitoring of driving environment/driving of vehicle/level 2 system and instantaneous measure for emergent situation) |
| LEVEL 4 | High autonomous driving | Perform all driving functions while driver is on board, except for extremely exceptional situation | May selectively perform measure for emergency situation when transfer of control right of level 4 system is requested |
| LEVEL 5 | Full autonomous driving | Perform all driving functions which system may cope with without any driver | Determine only whether system is to be operated and do not perform all driving operations |

FIG.1

VEHICLE FOR TRACKING SPEED PROFILE AND CONTROL METHOD THEREOF

CROSS REFERENCE TO RELATED APPLICATIONS

This application claims the benefit of priority to Korean Patent Application No. 10-2021-0076183, filed in the Korean Intellectual Property Office on Jun. 11, 2021, the entire contents of which are incorporated herein by reference.

TECHNICAL FIELD

The present disclosure relates to a vehicle for tracking a speed profile generated based on a current driving state and an operation method thereof, and more particularly, relates to technologies of providing a vehicle for reducing an error between the speed profile and an actual behavior of the vehicle due to a vehicle characteristic.

BACKGROUND

An autonomous vehicle needs a capability of controlling driving of a vehicle based on a surrounding situation which changes in real time while driving.

Particularly, the autonomous vehicle may generate a speed profile which is a speed prediction value of the vehicle with respect to a unit time depending on a driving environment of the vehicle and a current speed of the vehicle and may control controllers included in the vehicle based on the speed profile to control driving of the vehicle.

In an existing autonomous vehicle, an error occurs between the speed profile and an actual behavior of the vehicle due to an operation characteristic of the vehicle and acceleration and deceleration of the vehicle may be frequently generated due to the error, thus causing a sense of difference in riding.

SUMMARY

The present disclosure has been made to solve the above-mentioned problems occurring in the prior art while advantages achieved by the prior art are maintained intact.

By generating a tracking acceleration by reflecting acceleration for a plurality of time points on a speed profile, a vehicle may perform a behavior to be approximated to the speed profile.

An aspect of the present disclosure provides a vehicle for generating a tracking acceleration and a method for generating various tracking accelerations.

According to an aspect of the present disclosure, a vehicle may include a speed profile generating device that generates a speed profile indicating an expected speed change of a vehicle with respect to a unit time, based on a current driving state of the vehicle, a time point selecting device that selects a target time point, a first time point earlier than the target time point, and a second time point later than the target time point from the speed profile, a tracking acceleration generating device that generates a tracking acceleration for tracking the speed profile based on the target time point, the first time point, the second time point, and the speed profile, and a controller module that controls a driving state of the vehicle based on the tracking acceleration.

Furthermore, according to an embodiment, the speed profile generating device may receive information about the current driving state at a predetermined period from the controller module.

Furthermore, according to an embodiment, the time point selecting device may select the target time point based on a response limit time for the tracking acceleration of the controller module.

Furthermore, according to an embodiment, the vehicle may further include an error calculating device that calculates a target acceleration based on the target time point and the speed profile and generates an error value corresponding to a difference between a target acceleration profile where the vehicle accelerates at the target acceleration and the speed profile with respect to at least one time point in the unit time.

Furthermore, according to an embodiment, the time point selecting device may select a time point earlier than the target time point by a predetermined time as the first time point and may select a time point later than the target time point by the predetermined time as the second time point.

Furthermore, according to an embodiment, the tracking acceleration generating device may calculate a first acceleration based on the first time point and the speed profile, may calculate a second acceleration based on the second time point and the speed profile, and may calculate the tracking acceleration based on the target acceleration, the first acceleration, and the second acceleration.

Furthermore, according to an embodiment, the tracking acceleration generating device may receive a first error value corresponding to the first time and a second error value corresponding to the second time point from the error calculating device, may reflect the first acceleration in the tracking acceleration, when the first error value is greater than or equal to a predetermined ratio with respect to a current speed of the vehicle, and may reflect the second acceleration in the tracking acceleration, when the second error value is greater than or equal to the predetermined ratio with respect to the current speed of the vehicle.

Furthermore, according to an embodiment, the time point selecting device may select a time point having the largest error value among time points earlier than the target time point as the first time point and may select a time point having the largest error value among time points later than the target time point as the second time point.

Furthermore, according to an embodiment, the tracking acceleration generating device may generate a first weight by dividing a time from a current time point to the first time point by a time from the current time point to the target time point and may generate a second weight by dividing a time from the target time point to the second time point by a time from the current time point to the second time point.

Furthermore, according to an embodiment, the tracking acceleration generating device may calculate a first acceleration based on the first time point and the speed profile, may calculate a second acceleration based on the second time point and the speed profile, and may calculate the tracking acceleration based on the target acceleration, the first acceleration, and the second acceleration.

Furthermore, according to an embodiment, the tracking acceleration generating device may reflect a value obtained by calculating the first weight at the first acceleration in the tracking acceleration, when the first error value is greater than or equal to a predetermined ratio with respect to a current speed of the vehicle and may reflect a value obtained by calculating the second weight at the second acceleration in the tracking acceleration, when the second error value is greater than or equal to the predetermined ratio with respect to the current speed of the vehicle.

According to another aspect of the present disclosure, a control method of a vehicle may include generating a speed profile indicating an expected speed change of a vehicle with respect to a unit time, based on a current driving state of the vehicle, selecting a target time point from the speed profile, selecting a first time point earlier than the target time and a second time point later than the target time point, generating a tracking acceleration for tracking the speed profile based on the target time point, the first time point, the second time point, a current speed of the vehicle, and the speed profile, and controlling a driving state of the vehicle based on the tracking acceleration.

Furthermore, according to another embodiment, the control method may further include transmitting and receiving information about the current driving state at a predetermined period.

Furthermore, according to another embodiment, the control method may further include calculating a target acceleration based on the target time point and the speed profile and generating an error value corresponding to a difference between a target acceleration profile where the vehicle accelerates at the target acceleration and the speed profile with respect to at least one time point in the unit time.

Furthermore, according to another embodiment, the selecting of the first time point and the second time point may include selecting a time point earlier than the target time point by a predetermined time as the first time point and selecting a time point later than the target time point by the predetermined time as the second time point.

Furthermore, according to another embodiment, the generating of the tracking acceleration may include calculating a first acceleration based on the first time point and the speed profile, calculating a second acceleration based on the second time point and the speed profile, and calculating the tracking acceleration based on the target acceleration, the first acceleration, and the second acceleration.

Furthermore, according to another embodiment, the generating of the tracking acceleration may include receiving a first error value corresponding to the first time and a second error value corresponding to the second time point, reflecting the first acceleration in the tracking acceleration, when the first error value is greater than or equal to a predetermined ratio with respect to a current speed of the vehicle, and reflecting the second acceleration in the tracking acceleration, when the second error value is greater than or equal to the predetermined ratio with respect to the current speed of the vehicle.

Furthermore, according to another embodiment, the selecting of the first time point and the second time point may include selecting a time point having the largest error value among time points earlier than the target time point as the first time point and selecting a time point having the largest error value among time points later than the target time point as the second time point.

Furthermore, according to another embodiment, the generating of the tracking acceleration may include generating a first weight by dividing a time from a current time point to the first time point by a time from the current time point to the target time point and generating a second weight by dividing a time from the target time point to the second time point by a time from the current time point to the second time point.

Furthermore, according to another embodiment, the generating of the tracking acceleration may include calculating a first acceleration based on the first time point and the speed profile, calculating a second acceleration based on the second time point and the speed profile, and calculating the tracking acceleration based on the target acceleration, the first acceleration, and the second acceleration.

Furthermore, according to another embodiment, the generating of the tracking acceleration may include reflecting a value obtained by calculating the first weight at the first acceleration in the tracking acceleration, when a first error value corresponding to the first time point is greater than or equal to a predetermined ratio with respect to a current speed of the vehicle and reflecting a value obtained by calculating the second weight at the second acceleration in the tracking acceleration, when a second error value corresponding to the second time point is greater than or equal to the predetermined ratio with respect to the current speed of the vehicle.

BRIEF DESCRIPTION OF THE FIGURES

The above and other objects, features and advantages of the present disclosure will be more apparent from the following detailed description taken in conjunction with the accompanying drawings:

FIG. 1 is a table where an automation level of an autonomous vehicle is defined.

DETAILED DESCRIPTION

Figure 2:
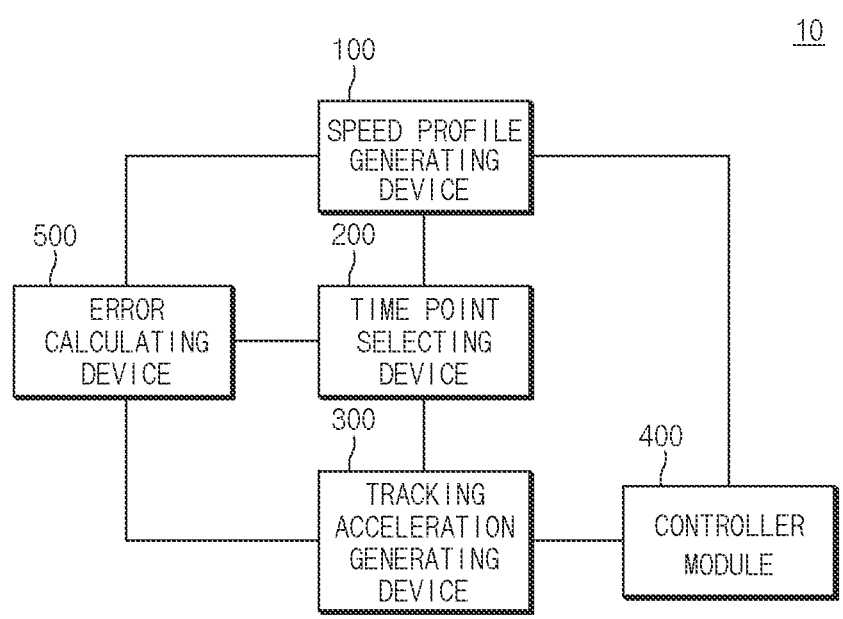
FIG. 2 is a block diagram illustrating a configuration of a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a table where an automation level of an autonomous vehicle is defined.

An autonomous vehicle refers to a vehicle which recognizes a driving environment by itself to determine risk, controls its driving route to minimize driving manipulation of a driver, and drives itself.

Finally, the autonomous vehicle refers to a vehicle capable of performing driving, steering, and parking without influence of persons and is focused on a vehicle where an autonomous driving technology, which is the core foundation of the autonomous vehicle, that is, a capability of operating the vehicle without active control or monitoring of the driver, is developed to the highest degree.

Referring to FIG. 1, the driving environment is monitored by the driver in automation levels LEVELs 0 to 2. On the other hand, the driving environment is monitored by the automated driving system in automation levels LEVELs 3 to 5.

However, the concept of autonomous vehicles currently on the market may include an intermediate automation level to a fully autonomous vehicle and may correspond to a goal-oriented concept premised on the mass production and commercialization of fully autonomous vehicles.

A control method of a vehicle according to an embodiment of the present disclosure is applicable to an autonomous vehicle corresponding to LEVEL 2 (partial automation) and LEVEL 3 (conditional automation) in autonomous driving automation levels shown in FIG. 1, but is not necessarily limited thereto, and is applicable to an autonomous vehicle supporting a plurality of various automation levels.

An automation level of the autonomous vehicle may be classified as shown in a table of FIG. 1 on the basis of society of automotive engineers (SAE).

FIG. 2 is a block diagram illustrating a configuration of a vehicle 10 according to an embodiment of the disclosure.

Referring to FIG. 2, the vehicle 10 may include a speed profile generating device 100 for generating a speed profile, a time point selecting device 200 for selecting a plurality of time points on the speed profile, a tracking acceleration generating device 300 for generating a tracking acceleration for tracking the speed profile, a controller module 400 for controlling a driving state of the vehicle 10 based on the tracking acceleration, and an error calculating device 500 for generating an error value for at least one time point in a unit time.

Each of the speed profile generating device 100, the time point selecting device 200, the tracking acceleration generating device 300, the controller module 400, and the error calculating device 500 may include a processor and a memory. The processor may perform an operation corresponding to each of the components. Furthermore, the memory may store data for controlling each of the components.

The processor and the memory may be separately included in the respective components (e.g., the speed profile generating device 100, the time point selecting device 200, the tracking acceleration generating device 300, the controller module 400, and the error calculating device 500) included in the vehicle 10.

Furthermore, in another embodiment, the processor and the memory may be included in the vehicle to perform an operation corresponding to each component (e.g., the speed profile generating device 100, the time point selecting device 200, the tracking acceleration generating device 300, the controller module 400, or the error calculating device 500) and data storage in an integrated manner.

The speed profile generating device 100 may generate a speed profile indicating an expected speed change of the vehicle 10 with respect to a predetermined unit time based on the current driving state of the vehicle 10.

According to an embodiment, the speed profile generating device 100 may receive information about the current driving state of the vehicle 10 at a predetermined period from the controller module 400. The current driving state of the vehicle 10 may illustratively include a current driving speed of the vehicle 10, environmental information around the vehicle 10, and the like. The environmental information around the vehicle 10 may illustratively be information including information about a road where the vehicle 10 is traveling, information about another vehicle which is traveling around the vehicle 10, and the like.

The speed profile generating device 100 may generate a speed profile corresponding to an expected speed change of the vehicle 10 during a unit time based on the current speed of the vehicle 10 and the environmental information around the vehicle 10.

For example, the speed profile generating device 100 may collect acceleration and deceleration pattern data of a driver and may generate a speed profile having a speed change based on an acceleration and deceleration pattern corresponding to the collected pattern data.

Furthermore, the speed profile generating device 100 may reflect a smart cruise control (SCC) technology of recognizing a distance from a surrounding vehicle and controlling the vehicle 10 to generate the speed profile.

The speed profile generating device 100 may receive information about a current driving state of the vehicle 10 at a predetermined period and may generate a speed profile of the vehicle 10 with respect to a unit time based on the received information.

Illustratively, the speed profile generating device 100 may receive information about a current driving state of the vehicle 10 at intervals of 0.5 seconds and may update a speed profile of the vehicle 10 at intervals of 0.5 seconds.

The speed profile may indicate an expected speed of the vehicle 10 during a predetermined unit time. The speed profile may illustratively indicate an expected speed of the vehicle 10 during 2.5 seconds from a current time point. Furthermore, the speed profile may indicate a speed of the vehicle 10 corresponding to any time point in the predetermined unit time.

The time point selecting device 200 may select a target time point, a first time point earlier than the target time point, and a second time point later than the target time point from the speed profile.

The target time point may be set based on a response limit time of the controller module 400 among random time points included in a unit time of the speed profile. The response limit time of the controller module 400 may be a time determined based on a delay generated by each controller included in the controller module 400.

For example, while a torque controller controls a torque of the vehicle 10 based on the tracking acceleration, there may occur a difference between an actual torque of the vehicle 10 and a target torque of the torque controller.

The difference may occur due to a time difference in data transmission and reception between network devices (e.g., CAN communication, Ethernet communication, or the like) included in the vehicle 10, a time difference between control of the torque controller and an operation of a device (e.g., an engine or the like) which controls an actual torque, or the like. In other words, the response limit time of the controller module 400 may be generated due to a behavior characteristic of the vehicle 10.

According to an embodiment, the time point selecting device 200 may select a time point after the response limit time of the controller module 400 from a current time point as the target time point. Illustratively, when the response limit time of the controller module 400 is one second, the target time point may be a time point after one second from the current time point.

When the time point prior to the response limit time is selected as the target time point, there may occur a delay in controlling a driving state of the vehicle 10 using a tracking acceleration calculated based on the target time point. Thus, the time point selecting device 200 may be configured to select a time point after the response limit time as the target time point and calculate a tracking acceleration based on the target time point.

The time point selecting device 200 may select a first time point earlier than the target time point and a second time point later than the target time point. According to an embodiment, the time point selecting device 200 may select a plurality of time points other than the first time point and the second time point.

For example, the time point selecting device 200 may further select a third time point between the target time point and the first time point and a fourth time point between the target time point and the second time point. When the plurality of time points on the speed profile are selected, the tracking acceleration generating device 300 may reflect acceleration corresponding to the plurality of time points to generate a tracking acceleration.

According to an embodiment, the selected first time point and the selected second time point may be the basis of generating the tracking acceleration.

According to an embodiment, the first time point and the second time point may be times having a difference with the target time point by a predetermined time. According to another embodiment, the first time point and the second time point may be selected based on an error value calculated by the error calculating device 500.

The tracking acceleration generating device 300 may generate a tracking acceleration for the vehicle 10 to track the speed profile. The tracking acceleration may refer to an acceleration of the target time point the vehicle 10 should have such that the vehicle 10 performs an approximate behavior to the speed profile.

According to an embodiment, the target time point may be determined based on the response limit time of the controller module 400, and the acceleration of the vehicle 10 may be controlled after the target time point.

When the tracking acceleration is generated by reflecting the first time, a time point prior to the response limit time of the controller module 400 may be reflected in the tracking acceleration. Furthermore, when the tracking acceleration is generated by reflecting the second time point, a speed change on the speed profile after the response limit time may be reflected in the tracking acceleration.

According to an embodiment, the tracking acceleration generating device 300 may select a first speed which is a speed on the speed profile, corresponding to the first time point, and a second speed which is a speed on the speed profile, corresponding to the second time point.

Furthermore, the tracking acceleration generating device 300 may calculate a first acceleration where the current speed of the vehicle 10 becomes a speed of the first time point on the speed profile and a second acceleration where the current speed of the vehicle 10 becomes a speed of the second time point on the speed profile.

The tracking acceleration generating device 300 may generate the tracking acceleration based on the first acceleration, the second acceleration, and a target acceleration received from the error calculating device 500.

The controller module 400 may illustratively include a torque controller for controlling a driving torque of the vehicle 10, a braking controller for controlling braking of the vehicle 10, an integrated controller (e.g., a body control module) for controlling an electronic device included in the vehicle 10, a steering controller for controlling a direction of the vehicle 10, and the like.

The controller module 400 may transmit information about the current driving state of the vehicle 10 to the speed profile generating device 100. The information about the current driving state of the vehicle 10 may include information about a current speed of the vehicle 10, a current acceleration of the vehicle 10, a driving direction of the vehicle 10, and a driving environment of the vehicle 10, or the like.

The controller module 400 may transmit the information about the current driving state of the vehicle 10 to the speed profile generating device 100 at a predetermined period. The predetermined period may be illustratively 0.5 seconds.

The error calculating device 500 may calculate a target acceleration based on the target time point and the speed profile. The error calculating device 500 may generate a target acceleration profile where the vehicle 10 accelerates at the target acceleration during a predetermined time from a current speed. The error calculating device 500 may generate an error value corresponding to a difference between the target acceleration profile and the speed profile with respect to any time point in a predetermined time.

The error calculating device 500 may select a target speed which is a speed on the speed profile corresponding to the target time point. The error calculating device 500 may calculate a target acceleration which is acceleration where the vehicle 10 has a target speed at a target time point based on the target speed and the current speed.

A profile where the vehicle 10 accelerates at the target acceleration during any time from the current speed may be referred to as a target acceleration profile. The any time may be identical to a unit time of the speed profile and may be 2.5 seconds, for example.

The error calculating device 500 may calculate a difference between the target acceleration profile and the speed profile with respect to any time point on the speed profile indicating an expected speed of the vehicle 10 during a unit time. The difference between the target acceleration profile and the speed profile with respect to the any time may be referred to as an error value.

The error calculating device 500 may generate error values with respect to any time included in the unit time. According to an embodiment, the time point selecting device 200 may receive the error values from the error calculating device 500. The time point selecting device 200 may select the first time point and the second time point based on the error values.

Furthermore, according to another embodiment, the tracking acceleration generating device 300 may determine whether to reflect a first acceleration in the tracking acceleration based on a first error value which is an error value corresponding to the first time point. Likewise, the tracking acceleration generating device 300 may determine whether to reflect a second acceleration in the tracking acceleration based on a second error value which is an error value corresponding to the second time point.

Figure 3:
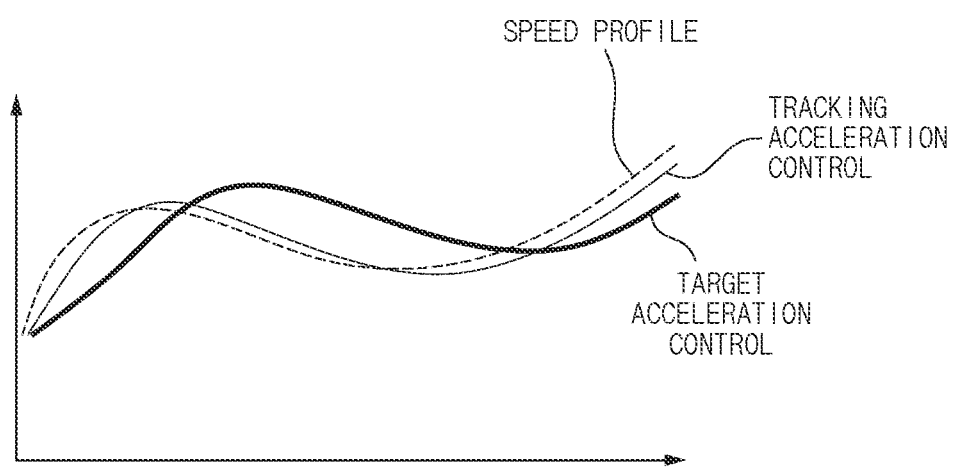
FIG. 3 is a graph illustrating a speed profile, a change in speed of a vehicle when controlling the vehicle based on a target acceleration, and a change in speed of the vehicle when controlling the vehicle based on a tracking acceleration according to an embodiment of the present disclosure.

FIG. 3 is a graph illustrating a speed profile, a change in speed of a vehicle 10 when controlling the vehicle 10 based on a target acceleration, and a change in speed of the vehicle 10 when controlling the vehicle 10 based on a tracking acceleration according to an embodiment of the present disclosure.

As described above, a time point selecting device 200 of FIG. 2 may set a target time point on a speed profile. Furthermore, the target acceleration may be calculated by means of an error calculating device 500 of FIG. 2.

As the target acceleration does not reflect a speed profile prior to the target time point and a speed profile after the target time point, as shown in FIG. 3, when the vehicle 10 is controlled according to the target acceleration, a delay between the speed profile and an actual behavior of the vehicle 10 may occur.

On the other hand, when controlled according to a tracking acceleration, the vehicle 10 may perform a behavior to be more approximated to the speed profile than control according to the target acceleration.

Figure 4:
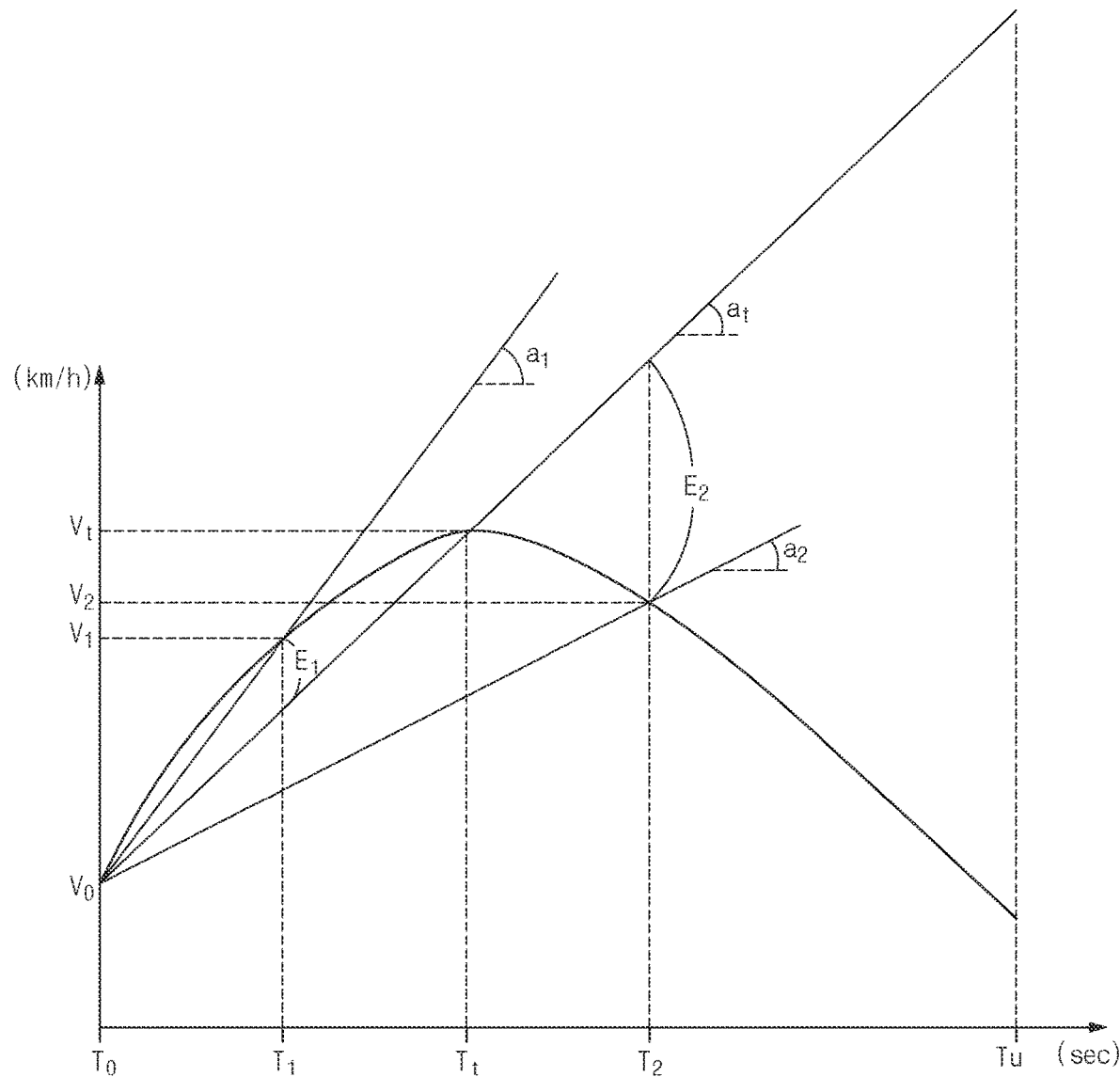
FIG. 4 is a drawing illustrating a method for selecting a time point and a method for generating a tracking acceleration according to an embodiment of the present disclosure.

FIG. 4 is a drawing illustrating a method for selecting a time point and a method for generating a tracking acceleration according to an embodiment of the present disclosure.

A speed profile indicating an expected speed change of a vehicle (e.g., a vehicle 10 of FIG. 2) with respect to a unit time $T_u$ is shown in FIG. 4. The unit time $T_u$ may illustratively be 2.5 seconds.

A time point selecting device (e.g., a time point selecting device 200 of FIG. 2) may select a time point which elapses by a predetermined time from a current time point $T_0$ as a target time point $T_t$. The target time point $T_t$ may illustratively be a time point which elapses by one second from the current time point $T_0$, and a difference between the current time point $T_0$ and the target time point $T_t$ may be determined based on a response limit time of a controller module (e.g., a controller module 400 of FIG. 2).

According to an embodiment, the time point selecting device 200 may select a time point earlier than the target time point $T_t$ by a predetermined time as a first time point $T_1$. Furthermore, the time point selecting device 200 may select a time point later than the target time point $T_t$ by the predetermined time as a second time point $T_2$. The predetermined time may be 0.5 seconds, for example.

An error calculating device (e.g., an error calculating device 500 of FIG. 2) may calculate a target acceleration $a_t$ based on the target time point $T_t$ and the speed profile.

The target acceleration $a_t$ may be calculated based on a target speed $V_t$, which is a speed on the speed profile corresponding to the target time point $T_t$, and a current speed $V_0$ of the vehicle 10. The target acceleration $a_t$ may be acceleration such that the vehicle 10 has the target speed $V_t$ at the target time point $T_t$. For example, the target acceleration $a_t$ may be a slope obtained by dividing a value, obtained by subtracting the current speed $V_0$ from the target speed $V_t$, by a value obtained by subtracting the current time point $T_0$ from the target time point $T_t$.

A profile where the vehicle 10 accelerates at the target acceleration $a_t$ during any time from the current speed $V_0$ may be referred to as a target acceleration profile. The error calculating device 500 may generate an error value corresponding to a difference between the target acceleration profile and the speed profile. The any time may be identical to a unit time of the speed profile and may illustratively be 2.5 seconds. Each error value may correspond to any time point on the speed profile.

For example, a first error value $E_1$ corresponding to the first time point $T_1$ may be calculated based on a difference between a first speed $V_1$, which is a speed on the speed profile corresponding to the first time point $T_1$, and a speed on the target acceleration profile corresponding to the first time point $T_1$.

Likewise, a second error value $E_2$ corresponding to the second time point $T_2$ may be calculated based on a difference between a second speed $V_2$, which is a speed on the speed profile corresponding to the second time point $T_2$, and a speed on the target acceleration profile corresponding to the second time point $T_2$.

A tracking acceleration generating device (e.g., a tracking acceleration generating device 300 of FIG. 2) may calculate a first acceleration $a_1$ based on the first time $T_1$ and the speed profile. For example, the first acceleration $a_1$ may be a slope obtained by dividing a value, obtained by subtracting the current speed $V_0$ from the first speed $V_1$ which is a speed of the vehicle at the first time point $T_1$, by a value obtained by subtracting the current time point $T_0$ from the first time point $T_1$.

The tracking acceleration generating device 300 may calculate a second acceleration $a_2$ based on the second time $T_2$ and the speed profile. For example, the second acceleration $a_2$ may be a slope obtained by dividing a value, obtained by subtracting the current speed $V_0$ from the second speed $V_2$ which is a speed of the vehicle at the second time point $T_2$, by a value obtained by subtracting the current time point $T_0$ from the second time point $T_2$.

The tracking acceleration generating device 300 may calculate a tracking acceleration TA based on the target acceleration $a_t$, the first acceleration $a_1$, and the second acceleration $a_2$.

According to an embodiment, the tracking acceleration generating device 300 may calculate the tracking acceleration TA by adding a value, obtained by multiplying the target acceleration $a_t$ by a first weight $G_1$ and the first acceleration $a_1$, to a value obtained by multiplying the target acceleration $a_t$ by a second weight $G_2$ and the second acceleration $a_2$. The first weight $G_1$ and the second weight $G_2$ may be constant values. Illustratively, the first weight $G_1$ may be ½, and the second weight $G_2$ may be ⅓.

According to an embodiment, the tracking acceleration generating device 300 may determine whether to reflect the first acceleration $a_1$ in the tracking acceleration TA depending on the ratio of a first error value $E_1$ to the current speed $V_0$. Furthermore, the tracking acceleration generating device 300 may determine whether to reflect the second acceleration $a_2$ in the tracking acceleration TA depending on the ratio of a second error value $E_2$ to the current speed $V_0$.

For example, upon high driving where the current speed $V_0$ of the vehicle 10 is greater than or equal to 60 km/h, when the first error value $E_1$ is less than ¹⁄₁₀ of the current speed $V_0$, the tracking acceleration generating device 300 may make the first weight $G_1$ for the first acceleration $a_1$ 0 such that the first acceleration $a_1$ is not reflected in the tracking acceleration TA. Likewise, upon high driving where the current speed $V_0$ of the vehicle 10 is greater than or equal to 60 km/h, when the second error value $E_2$ is less than 1/10 of the current speed $V_0$, the tracking acceleration generating device 300 may make the second weight $G_2$ for the second acceleration $a_2$ 0 such that the second acceleration $a_2$ is not reflected in the tracking acceleration TA.

Upon low driving where the current speed $V_0$ of the vehicle 10 is less than 60 km/h, when the first error value $E_1$ is less than 3/10 of the current speed $V_0$, the tracking acceleration generating device 300 may make the first weight $G_1$ 0 such that the first acceleration $a_1$ is not reflected in the tracking acceleration TA. Likewise, upon low driving where the current speed $V_0$ of the vehicle 10 is less than 60 km/h, when the second error value $E_2$ is less than 1/10 of the current speed $V_0$, the tracking acceleration generating device 300 may make the second weight $G_2$ 0 such that the second acceleration $a_2$ is not reflected in the tracking acceleration TA.

The tracking acceleration generating device 300 may selectively reflect acceleration $a_t$ a time when the error value is greater than or equal to a predetermined ratio with respect to the current speed $V_0$ of the vehicle 10 to generate the tracking acceleration TA.

According to an embodiment, the tracking acceleration TA may be the sum of a value, obtained by multiplying the target acceleration $a_t$ by the first weight $G_1$ and the first acceleration $a_t$, and a value obtained by multiplying the target acceleration $a_t$ by the second weight $G_2$ and the second acceleration $a_2$. Illustratively, the tracking acceleration TA may be the same as the following formula.

$$TA = a_t + G_1 * a_1 + G_2 * a_2$$

According to an embodiment, when the error value is less than the predetermined ratio with respect to the current speed $V_0$ of the vehicle 10, the tracking acceleration generating device 300 may ignore acceleration at a corresponding time point. At this time, the tracking acceleration generating device 300 may calculate a weight for the time point as "0".

Figure 5:
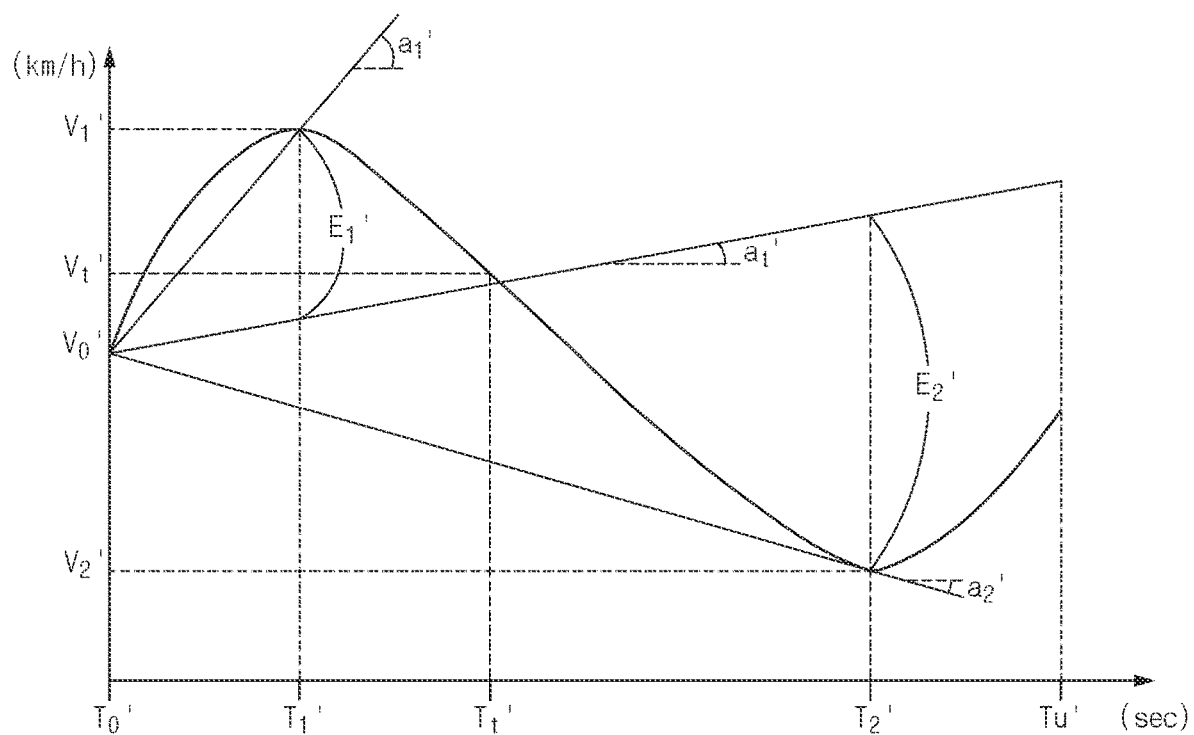
FIG. 5 is a drawing illustrating a method for selecting a time point and a method for generating a tracking acceleration according to another embodiment of the present disclosure.

FIG. 5 is a drawing illustrating a method for selecting a time point and a method for generating a tracking acceleration according to another embodiment of the present disclosure.

A speed profile indicating an expected speed change of a vehicle (e.g., a vehicle 10 of FIG. 2) with respect to a unit time $T_u'$ is shown in FIG. 5. The unit time $T_u'$ may be 2.5 seconds.

According to an embodiment, a time point selecting device (e.g., a time point selecting device 200 of FIG. 2) may select a time point which elapses by a predetermined time from a current time point $T_0'$ as a target time point $T_t'$. The target time point $T_t'$ may illustratively be a time point which is after one second from the current time point $T_0'$.

According to an embodiment, an error calculating device (e.g., an error calculating device 500 of FIG. 2) may calculate a target acceleration $a_t'$ based on the target time point $T_t'$ and the speed profile. The target acceleration $a_t'$ may be calculated in the same method as that described in FIG. 4. A profile where the vehicle 10 accelerates at the target acceleration $a_t'$ during any time from the current speed $V_0'$ may be referred to as a target acceleration profile.

The error calculating device 500 may generate an error value corresponding to a difference between the target acceleration profile and the speed profile with respect to all time points included in the speed profile. The error value may be calculated based on a difference between a speed on the speed profile and a speed on the target acceleration profile, with respect to any time point.

According to an embodiment, the time point selecting device 200 may select a time point having the largest error value among time points earlier than the target time point $T_t'$ as a first time point $T_1'$. Furthermore, the time point selecting device 200 may select a time point having the largest error value among time points later than the target time point $T_t'$ as a second time point $T_2'$. A time between the first time $T_1'$ and the target time point $T_t'$ may differ from a time between the second time $T_2'$ and the target time point $T_t'$.

A tracking acceleration generating device (e.g., a tracking acceleration generating device 300 of FIG. 2) may calculate a first acceleration $a_1'$ based on the first time $T_1'$ and the speed profile. For example, the first acceleration $a_1'$ may be a slope obtained by dividing a value, obtained by subtracting the current speed $V_0'$ from the first speed $V_1'$ which is a speed of the vehicle 10 at the first time point $T_1'$, by a value obtained by subtracting the current time point $T_0'$ from the first time point $T_1'$.

The tracking acceleration generating device 300 may calculate a second acceleration $a_2'$ based on the second time $T_2'$ and the speed profile. For example, the second acceleration $a_2'$ may be a slope obtained by dividing a value, obtained by subtracting the current speed $V_0'$ from the second speed $V_2'$ which is a speed of the vehicle 10 at the second time point $T_2'$, by a value obtained by subtracting the current time point $T_0'$ from the second time point $T_2'$.

The tracking acceleration generating device 300 may calculate a tracking acceleration TA' based on the target acceleration $a_t'$, the first acceleration $a_1'$, and the second acceleration $a_2'$. According to an embodiment, the tracking acceleration generating device 300 may calculate the tracking acceleration TA' by reflecting a value, obtained by multiplying the target acceleration $a_t'$ by a first weight $G_1'$ and the first acceleration $a_1'$, and a value obtained by multiplying the target acceleration $a_t'$ by a second weight $G_2'$ and the second acceleration $a_2'$.

According to an embodiment, the tracking acceleration TA' may be the sum of a value, obtained by multiplying the target acceleration $a_t'$ by the first weight $G_1'$ and the first acceleration $a_1'$, and a value obtained by multiplying the target acceleration $a_t'$ by the second weight $G_2'$ and the second acceleration $a_2'$. Illustratively, the tracking acceleration TA' may be the same as the following formula.

$$TA' = a_t' + G_1' * a_1' + G_2' * a_2'$$

According to an embodiment, the first weight $G_1'$ may be calculated based on the current time point $T_0'$, the target time point $T_t'$, and the first time point $T_1'$. The first weight may be obtained by dividing a value, obtained by subtracting the first time point $T_1'$ from the target time point $T_t'$, by a value obtained by subtracting the current time point $T_0'$ from the target time point $T_t'$. Illustratively, the first weight $G_1'$ may be the same as the following formula.

$$G1' = \frac{Tt' - T1'}{Tt' - T0'}$$

Furthermore, the second weight $G_2'$ may be calculated based on the current time point $T_0'$, the target time point $T_t'$, and the second time point $T_2'$. The second weight $G_2'$ may be obtained by dividing a value, obtained by subtracting the target time point $T_t'$ from the second time point $T_2'$, by a value obtained by subtracting the current time point $T_0'$ from the second time point $T_2'$. Illustratively, the second weight $G_2'$ may be the same as the following formula.

$$G2' = \frac{T2' - Tt'}{T2' - T0'}$$

According to an embodiment, the tracking acceleration generating device 300 may determine whether to reflect a value obtained by calculating the first weight $G_1'$ and the first acceleration $a_1$ with the tracking acceleration TA' depending on the ratio of a first error value $E_1'$ to the current speed $V_0'$.

Furthermore, the tracking acceleration generating device 300 may determine whether to reflect a value obtained by calculating the second weight $G_2'$ and the second acceleration $a_2'$ with the tracking acceleration TA' depending on the ratio of a second error value $E_2'$ to the current speed $V_0'$.

For example, upon high driving where the current speed $V_0'$ of the vehicle 10 is greater than or equal to 60 km/h, when the first error value $E_1'$ is less than $1/10$ of the current speed $V_0'$, the tracking acceleration generating device 300 may make the first weight $G_1'$ 0 such that the first acceleration $a_1'$ is not reflected in the tracking acceleration TA'.

Likewise, upon high driving where the current speed $V_0'$ of the vehicle 10 is greater than or equal to 60 km/h, when the second error value $E_2'$ is less than $1/10$ of the current speed $V_0'$, the tracking acceleration generating device 300 may make the second weight $G_2'$ 0 such that the second acceleration $a_2'$ is not reflected in the tracking acceleration TA'.

Upon low driving where the current speed $V_0'$ of the vehicle 10 is less than 60 km/h, when the first error value $E_1'$ is less than $3/10$ of the current speed $V_0'$, the tracking acceleration generating device 300 may make the first weight for the first acceleration $a_1'$ 0 such that the first acceleration $a_1'$ is not reflected in the tracking acceleration TA'.

Likewise, when the current speed $V_0'$ of the vehicle 10 is less than 60 km/h and when the second error value $E_2'$ is less than $1/10$ of the current speed $V_0'$, the tracking acceleration generating device 300 may make the second weight $G_2'$ for the second acceleration $a_2'$ 0 such that the second acceleration $a_2'$ is not reflected in the tracking acceleration TA'.

As described above with reference to FIG. 4, when the error value is less than a predetermined ratio with respect to the current speed $V_0'$, the tracking acceleration generating device 300 may approximate a speed profile from the current time point $T_0'$ to a corresponding time point to a target acceleration profile.

The tracking acceleration generating device 300 may selectively reflect acceleration at a time point when the error value is greater than or equal to the predetermined ratio with respect to the current speed $V_0'$ of the vehicle 10 to generate the tracking acceleration TA'.

Figure 6:
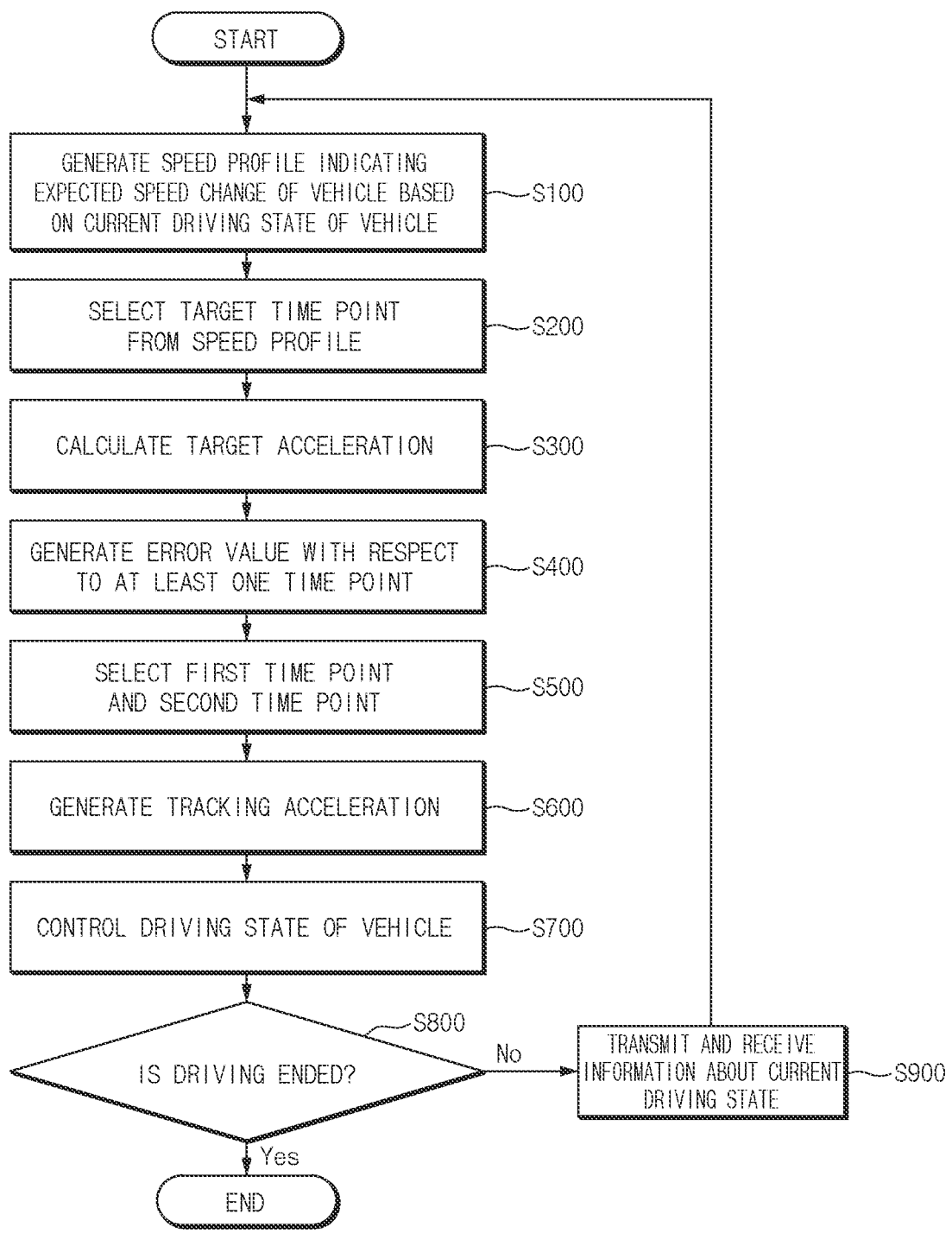
FIG. 6 is a flowchart illustrating a control method of a vehicle according to an embodiment of the present disclosure.

FIG. 6 is a flowchart illustrating a control method of a vehicle according to an embodiment of the present disclosure.

According to FIG. 6, in S100, a speed profile generating device (e.g., a speed profile generating device 100 of FIG. 2) may generate a speed profile indicating an expected speed change of a vehicle (e.g., a vehicle 10 of FIG. 2) with respect to a unit time based on a current driving state of the vehicle 10.

According to an embodiment, the unit time may vary based on calculation performance and a calculation period of the speed profile generating device 100 included in the vehicle 10.

A time point selecting device (e.g., a time point selecting device 200 of FIG. 2) may select a target time point from the speed profile in S200. According to an embodiment, the target time point may be determined based on a response limit time of a controller module (e.g., a controller module 400 of FIG. 2) included in the vehicle 10. In one example, the target time point may be after one second from a current time point.

In S300, an error calculating device (e.g., an error calculating device 500 of FIG. 2) may calculate a target acceleration based on the speed profile and the target time point.

When the vehicle 10 accelerates at any acceleration from the current time point to the target time point, the any acceleration where the speed of the vehicle 10 becomes a speed corresponding to the target time point on the speed profile may be referred to as the target acceleration.

In S400, the error calculating device 500 may generate an error value corresponding to at least one time point on the speed profile based on the target acceleration.

The error value may be an error value corresponding to a difference between the target acceleration profile and the speed profile. In other words, the error value may be calculated based on a difference between a speed on the speed profile and a speed on the target acceleration profile, with respect to any time point.

The target acceleration profile may be a profile indicating a speed of the vehicle which accelerates at the target acceleration during any time from the current speed. The any time may be identical to a unit time of the speed profile and may illustratively be 2.5 seconds.

In S500, the time point selecting device 200 may select a first time point earlier than the target time point and a second time point later than the target time point.

According to an embodiment, the time point selecting device 200 may select a time point earlier than the target time point by a predetermined time as the first time point and may select a time point later than the target time point by the predetermined time as the second time point.

According to another embodiment, the time point selecting device 200 may select a time point having the largest error value among time points earlier than the target time point as the first time point and may select a time point having the largest error value among time points later than the target time point as the second time point.

In S600, a tracking acceleration generating device (e.g., a tracking acceleration generating device 300 of FIG. 2) may generate a tracking acceleration based on the target time point, the first time point, the second time point, and the speed profile.

The tracking acceleration may be acceleration for tracking the speed profile. The vehicle 10 may perform behavior to be approximated to the speed profile predicted by the speed profile generating device 100 based on the tracking acceleration.

In S700, the controller module 400 may control a driving state of the vehicle 10 based on the tracking acceleration.

The controller module 400 may include a plurality of controllers for controlling the vehicle 10. The controllers may illustratively include a torque controller for controlling a driving torque of the vehicle 10, a braking controller for controlling braking of the vehicle 10, an integrated controller (e.g., a body control module) for controlling an electronic device included in the vehicle 10, a steering controller for controlling a direction of the vehicle 10, and the like.

The controller module 400 may determine whether the driving of the vehicle 10 is ended. When the driving of the vehicle 10 is not ended (No path of S800), in S900, the controller module 400 may transmit information about the current driving state of the vehicle 10 to the speed profile generating device 100. The speed profile generating device 100 may receive the information about the current driving state of the vehicle 10 and may generate a speed profile indicating an expected speed change of the vehicle 10 based on the received information.

The controller module 400 may transmit the information about the current driving state of the vehicle 10 at a predetermined period. Furthermore, the speed profile generating device 100 may generate a speed profile based on the information received at the predetermined period. When the driving of the vehicle 10 is ended (Yes path of S800), tracking control based on the speed profile may be ended.

Figure 7:
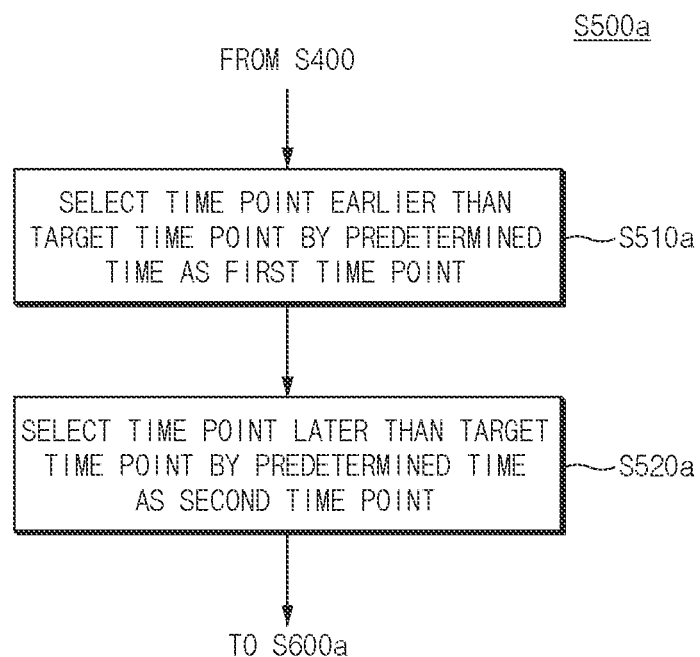
FIG. 7 is a flowchart illustrating a method for selecting a time point according to an embodiment of the present disclosure.

FIG. 7 is a flowchart illustrating a method for selecting a time point according to an embodiment of the present disclosure.

In S510a, a time point selecting device (e.g., a time point selecting device 200 of FIG. 2) may select a time earlier than a target time point by a predetermined time as a first time point.

The predetermined time may be set based on a current time point and the target time point. For example, the first time point may be a time point going away from the current time point and the target time point by the same time.

In S520a, the time point selecting device 200 may select a time later than the target time point by the predetermined time as a second time point.

A difference between the first time point and the target time point may be the same as a difference between the second time point and the target time point. According to an embodiment, the time point selecting device 200 may select the first time point and the second time point, each of which has a difference with the target time point by the predetermined time, without separate calculation. A tracking acceleration generating device (e.g., a tracking acceleration generating device 300 of FIG. 2) may generate a tracking acceleration based on the selected first time point and the selected second time point.

Figure 8:
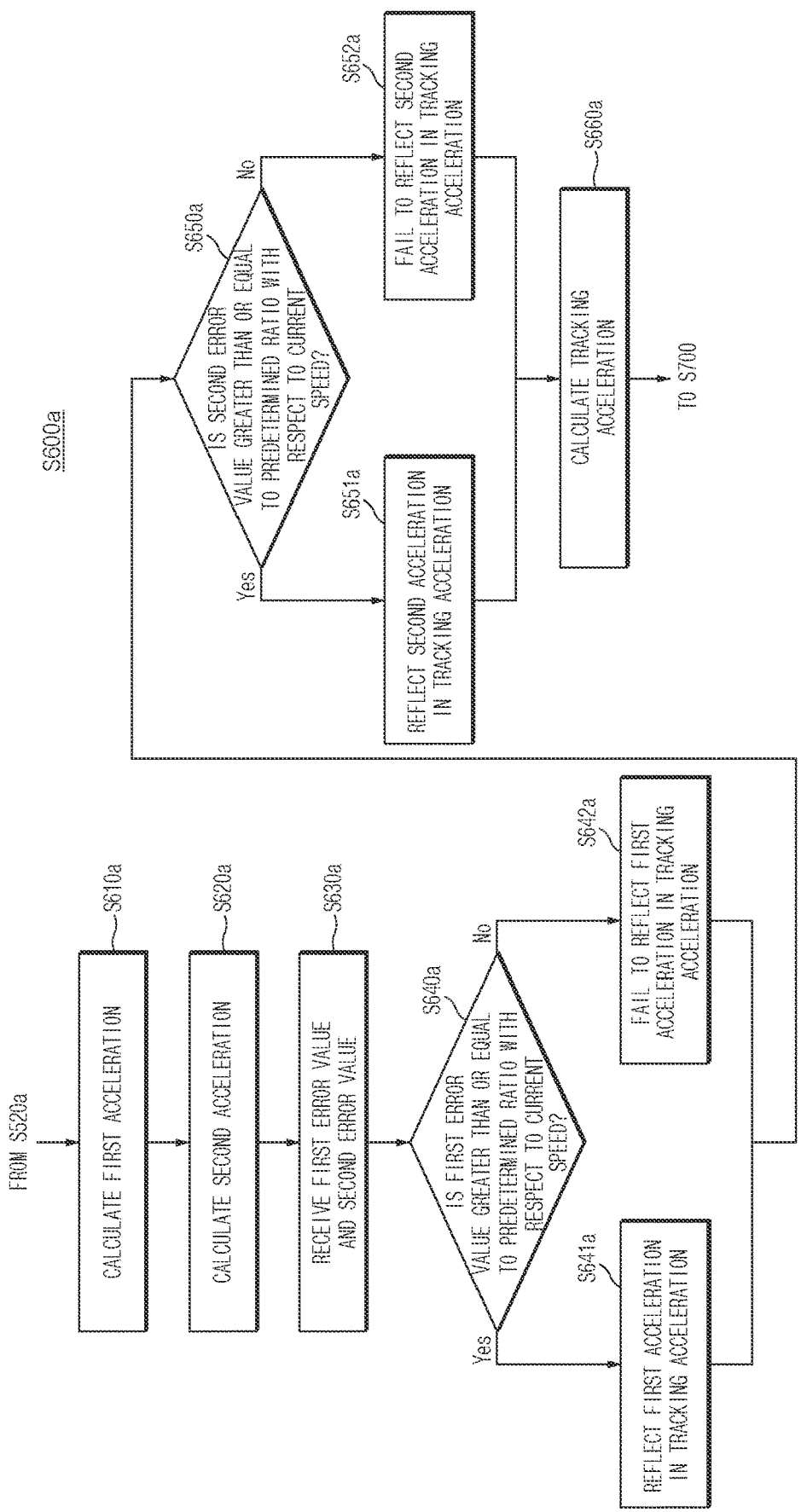
FIG. 8 is a flowchart illustrating a method for generating a tracking acceleration according to an embodiment of the present disclosure.

FIG. 8 is a flowchart illustrating a method for generating a tracking acceleration according to an embodiment of the present disclosure.

A method for generating a tracking acceleration in a tracking acceleration generating device (e.g., a tracking acceleration generating device 300 of FIG. 2) may be illustratively described with reference to FIG. 8.

In S610a, the tracking acceleration generating device 300 may calculate a first acceleration based on a first time point selected by a time point selecting device (e.g., a time point selecting device 200 of FIG. 2) and a speed profile.

The tracking acceleration generating device 300 may calculate the first acceleration based on the first time point, a first speed which is a speed on the speed profile corresponding to the first time point, a current speed of a vehicle (e.g., a vehicle 10 of FIG. 2), and a current time point. For example, when the vehicle 10 accelerates at any acceleration from the current time point to the first time point, acceleration where the current speed of the vehicle 10 becomes the first speed may be referred to as the first acceleration.

In S620a, the tracking acceleration generating device 300 may calculate a second acceleration based on a second time point selected by the time point selecting device 200 and the speed profile.

The tracking acceleration generating device 300 may calculate the second acceleration based on the second time point, a second speed which is a speed on the speed profile corresponding to the second time point, the current speed of the vehicle 10, and the current time point. For example, when the vehicle 10 accelerates at any acceleration from the current time point to the second time point, acceleration where the current speed of the vehicle 10 becomes the second speed may be referred to as the second acceleration.

In S630a, the tracking acceleration generating device 300 may receive a first error value and a second error value from an error calculating device (e.g., an error calculating device 500 of FIG. 2).

The error calculating device 500 may calculate a target acceleration based on a target time point selected by the time point selecting device 200. A speed on the speed profile corresponding to the target time point may be referred to as a target speed.

For example, when the vehicle 10 accelerates at any acceleration from the current time point to the target time point, acceleration where the current speed of the vehicle 10 becomes the target speed may be referred to as the target acceleration.

The error calculating device 500 may calculate a target acceleration profile where the vehicle 10 accelerates at the target time point during a predetermined time from the current time point. The error calculating device 500 may calculate a difference between a speed on the target acceleration profile and a speed on the speed profile with respect to any time point on the speed profile. The difference between the target acceleration profile and the speed profile with respect to the any time may be referred to as an error value.

For example, an error value corresponding to the first time point may be referred to as a first error value, and an error value corresponding to the second time point may be referred to as a second error value.

In S640a, the tracking acceleration generating device 300 may determine whether the received first error value is greater than or equal to a predetermined ratio with respect to a current speed of the vehicle 10.

When the first error value is greater than or equal to the predetermined ratio with respect to the current speed of the vehicle 10 (Yes path of S640a), in S641a, the tracking acceleration generating device 300 may reflect the first acceleration in the tracking acceleration. When the first error value is less than the predetermined ratio with respect to the current speed of the vehicle 10 (No path of S640a), in S642a, the tracking acceleration generating device 300 may fail to reflect the first acceleration in the tracking acceleration.

The ratio with respect to the current speed may vary with the current speed of the vehicle 10. For example, upon high driving where the current speed of the vehicle 10 is greater than or equal to 60 km/h, a ratio for determining whether to reflect the first acceleration in the tracking acceleration may be 1/10.

For example, when the current speed of the vehicle 10 is 60 km/h and when the first error value is less than 6 km/h, the tracking acceleration generating device 300 may fail to reflect the first acceleration in the tracking acceleration.

Furthermore, upon low driving where the current speed of the vehicle 10 is less than 60 km/h, a ratio for determining whether to reflect the second acceleration in the tracking acceleration may be 3/10.

For example, when the current speed of the vehicle 10 is 10 km/h and when the first error value is less than 3 km/h, the tracking acceleration generating device 300 may fail to reflect the first acceleration in the tracking acceleration.

When the first error value is less than the predetermined ratio with respect to the current speed, the tracking acceleration generating device 300 may approximate the speed profile from the current time point to the first time point to a target acceleration profile. Likewise, when the second error value is less than the predetermined ratio with respect to the current speed, the tracking acceleration generating device 300 may approximate the speed profile from the current time point to the second time point to the target acceleration profile. At this time, the tracking acceleration generating device 300 may fail to reflect the first acceleration and the second acceleration in the tracking acceleration to prevent the target acceleration from being duplicated and calculated.

By determining whether the error value is greater than or equal to the predetermined ratio with respect to the current speed of the vehicle 10, the tracking acceleration generating device 300 may selectively reflect acceleration at a time point when a change in speed of the vehicle 10 has a predetermined value or more on the speed profile to generate the tracking acceleration.

In S650a, the tracking acceleration generating device 300 may determine whether the received second error value is greater than or equal to the predetermined ratio with respect to the current speed of the vehicle 10.

When the second error value is greater than or equal to the predetermined ratio with respect to the current speed of the vehicle 10 (Yes path of S650a), in S651a, the tracking acceleration generating device 300 may reflect the second acceleration in the tracking acceleration. When the second error value is less than the predetermined ratio with respect to the current speed of the vehicle 10 (No path of S650a), in S652a, the tracking acceleration generating device 300 may fail to reflect the second acceleration in the tracking acceleration.

The method for determining whether the second error value is greater than or equal to the predetermined ratio with respect to the current speed of the vehicle 10 may be substantially the same as the determination method for the first error.

The tracking acceleration generating device 300 may adjust a first weight value calculated with the first acceleration to determine whether to reflect the first acceleration in the tracking acceleration. Likewise, the tracking acceleration generating device 300 may adjust a second weight value calculated with the second acceleration to determine whether to reflect the second acceleration in the tracking acceleration.

Illustratively, when the first acceleration is reflected in the tracking acceleration, the first weight may be ½. On the other hand, when the first acceleration is not reflected in the tracking acceleration, the first weight may be "0".

Furthermore, when the second acceleration is reflected in the tracking acceleration, the second weight may be ⅓. On the other hand, when the second acceleration is not reflected in the tracking acceleration, the second weight may be "0".

In S660a, the tracking acceleration generating device 300 may calculate a tracking acceleration based on the first acceleration, the second acceleration, and the target acceleration.

The tracking acceleration may be the sum of multiplying the target acceleration by the first acceleration and the first weight and multiplying the target acceleration by the second acceleration and the second weight.

Figure 9:
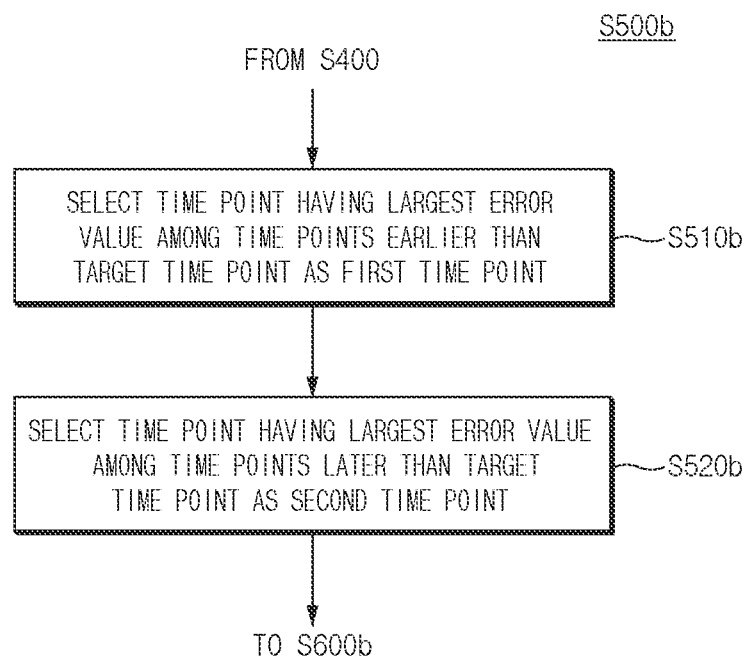
FIG. 9 is a flowchart illustrating a method for selecting a time point according to another embodiment of the present disclosure.

FIG. 9 is a flowchart illustrating a method for selecting a time point according to another embodiment of the present disclosure.

A description will be given of a method for selecting a first time point and a second time point based on error values calculated by an error calculating device (e.g., an error calculating device 500 of FIG. 2) in a time point selecting device (e.g., a time point selecting device 200 of FIG. 2) with reference to FIG. 9.

In S510b, the time point selecting device 200 may select a time point having the largest error value among time points earlier than a target time point as a first time point.

Because the method for calculating an error value is the same as those described with reference to FIGS. 4 and 8, a duplicated description thereof will be omitted. The error calculating device 500 may calculate a target acceleration based on a target speed corresponding to a target time point and may calculate an error value corresponding to each time point depending on a target acceleration profile where a vehicle (e.g., a vehicle 10 of FIG. 2) accelerates at the target acceleration.

According to an embodiment, the target time point may be after one second from the current time point based on a response limit time of each of controllers included in a controller module (e.g., a controller module 400 of FIG. 2). Thus, the first time point may be a time point having the largest error value among time points within one second from the current time point.

As the time point selecting device 200 selects the time point having the largest error value as the first time point, acceleration at a time point having the largest speed difference with the target acceleration profile, before the target time point, may be reflected in a tracking acceleration.

In S520b, the time point selecting device 200 may select a time point having the largest error value among time points later than the target time point as a second time point.

According to an embodiment, the target time point may be after one second from the current time point based on the response limit time of each of the controllers included in the controller module 400. Thus, the first time point may be a time point having the largest error value among time points within one second from the current time point.

As the time point selecting device 200 selects the time point having the largest error value as the second time point, acceleration at a time point having the largest speed difference with the target acceleration profile, after the target time point, may be reflected in the tracking acceleration.

Figure 10:
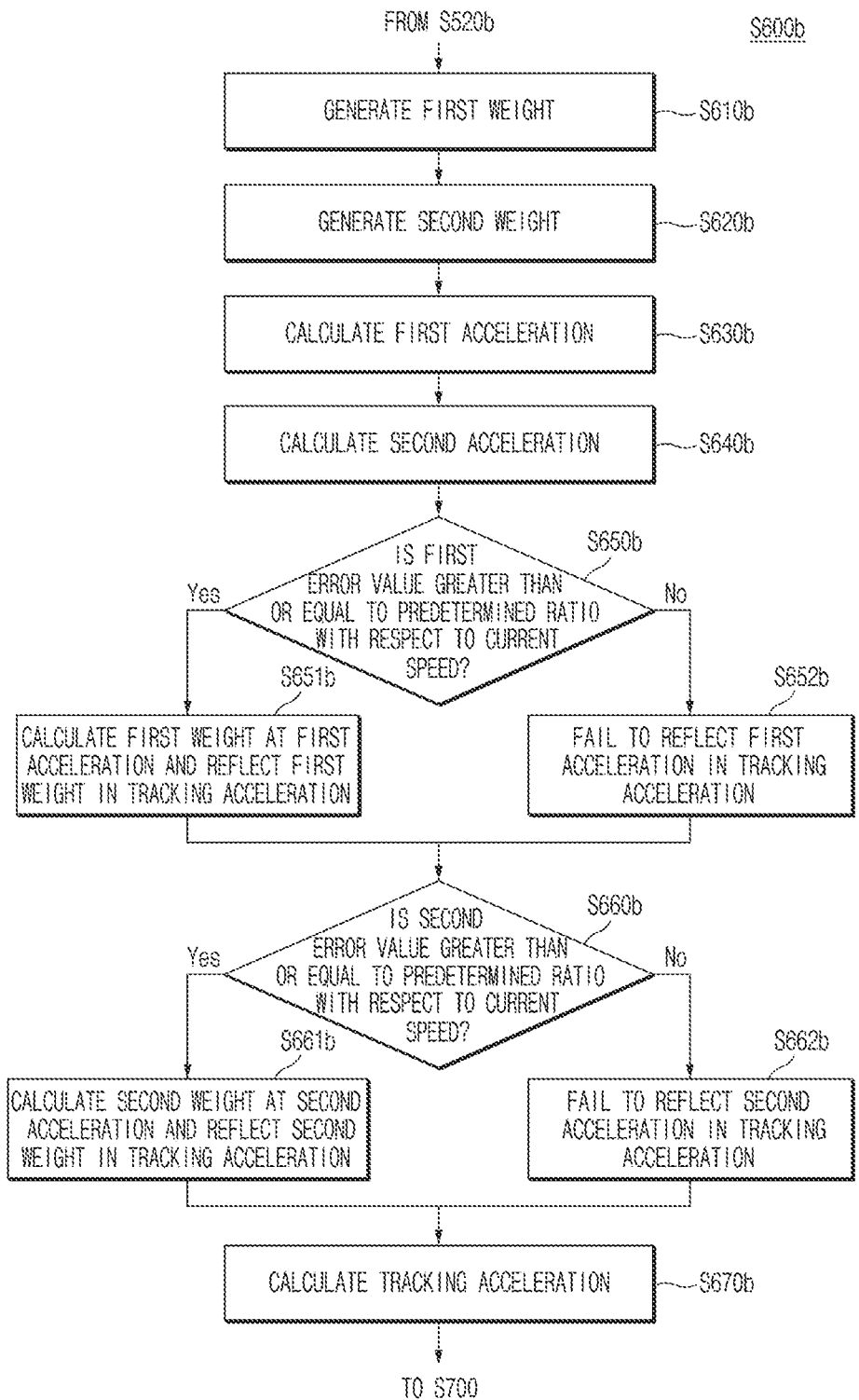
FIG. 10 is a flowchart illustrating a method for generating a tracking acceleration according to another embodiment of the present disclosure.

FIG. 10 is a flowchart illustrating a method for generating a tracking acceleration according to another embodiment of the present disclosure.

In S610b, a tracking acceleration generating device (e.g., a tracking acceleration generating device 300 of FIG. 2) may generate a first weight based on a current time point, a first time point, and a target time point.

According to an embodiment, the first weight may be obtained by dividing a value, obtained by subtracting the first time point from the target time point, by a value obtained by subtracting the current time point from the target time point.

As the first weight is calculated based on the first time point, the more adjacent the first time point is to the target time point, the lower the first weight may be calculated to be at a first acceleration. When the first time point is adjacent to the target time point, the tracking acceleration generating device 300 may calculate the first weight to be lower and may less reflect the first acceleration in a tracking acceleration.

In other words, as the tracking acceleration generating device 300 allows the first time point closer to the current time on a speed profile to have a higher first weight, a vehicle (e.g., a vehicle 10 of FIG. 2) may reflect a speed change before the target time point to perform a behavior.

In S620b, the tracking acceleration generating device 300 may generate a second weight based on the current time point, a second time point, and the target time point.

According to an embodiment, the second weight may be obtained by dividing a value, obtained by subtracting the target time point from the second time point, by a value obtained by subtracting the current time point from the second time point.

As the second weight is calculated based on the second time point, the more adjacent the second time point is to the target time point, the lower the second weight may be calculated to be at a second acceleration. When the second time point is adjacent to the target time point, the tracking acceleration generating device 300 may calculate the second weight to be lower and may less reflect the second acceleration in the tracking acceleration.

In other words, as the tracking acceleration generating device 300 allows the second time point going away from the current time on the speed profile to have a higher second weight, the vehicle 10 may reflect a speed change after the target time point to perform a behavior.

In S630b, the tracking acceleration generating device 300 may calculate the first acceleration based on the speed profile and the first time point.

Furthermore, in S640b, the tracking acceleration generating device 300 may calculate the second acceleration based on the speed profile and the second time point.

The method for calculating the first acceleration and the second acceleration may be substantially the same as that described with reference to FIG. 8.

In S650b, the tracking acceleration generating device 300 may determine whether a first error value is greater than or equal to a predetermined ratio with respect to a current speed of the vehicle 10.

When the first error value is greater than or equal to the predetermined ratio with respect to the current speed (Yes path of S650b), in S651b, the tracking acceleration generating device 300 may calculate a first weight with the first acceleration and may reflect the calculated first weight in a tracking acceleration.

When the first error value is less than the predetermined ratio with respect to the current speed (No path of S640a), in S651b, the tracking acceleration generating device 300 may fail to reflect the first acceleration in the tracking acceleration. Illustratively, the tracking acceleration generating device 300 may make the first weight 0.

In S660b, the tracking acceleration generating device 300 may determine whether a second error value is greater than or equal to the predetermined ratio with respect to the current speed.

When the second error value is greater than or equal to the predetermined ratio with respect to the current speed (Yes path of S660b), in S661b, the tracking acceleration generating device 300 may calculate a second weight with the second acceleration and may reflect the calculated second weight in the tracking acceleration.

When the second error value is less than the predetermined ratio with respect to the current speed (No path of S660b), in S662b, the tracking acceleration generating device 300 may fail to reflect the second acceleration in the tracking acceleration. Illustratively, the tracking acceleration generating device 300 may make the second weight 0.

The criterion for the ratio of the first error value or the second error value to the current speed may be substantially the same as that described with reference to FIG. 8. In other words, when the current speed is greater than or equal to 60 km/h and when the first error value or the second error value is greater than or equal to $1/10$ of the current speed, the tracking acceleration generating device 300 may reflect the first acceleration or the second acceleration in the tracking acceleration.

When the current speed is less than 60 km/h and when the first error value or the second error value is greater than or equal to $3/10$ of the current speed, the tracking acceleration generating device 300 may reflect the first acceleration or the second acceleration in the tracking acceleration.

In S670b, the tracking acceleration generating device 300 may calculate a tracking acceleration based on the first acceleration, the second acceleration, and the target acceleration.

The tracking acceleration may be the sum of multiplying the target acceleration by the first acceleration and the first weight and multiplying the target acceleration by the second acceleration and the second weight.

Figure 11:
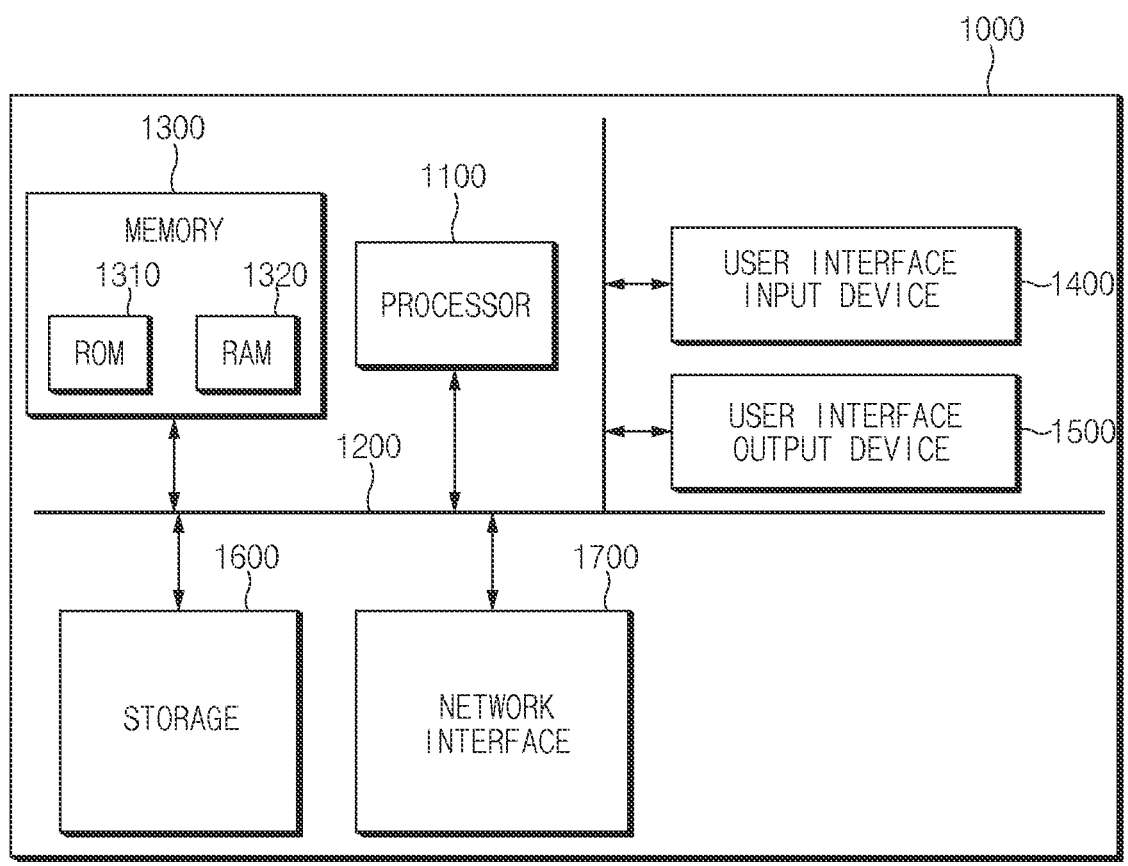
FIG. 11 is a block diagram illustrating a computing system for executing a control method of a vehicle according to an embodiment of the present disclosure.

FIG. 11 is a block diagram illustrating a computing system for executing a control method of a vehicle according to an embodiment of the present disclosure.

Referring to FIG. 11, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

An embodiment of the present disclosure may provide the vehicle that generates a speed profile and selects a target time point and time points before and after the target time point based on the generated speed profile.

Furthermore, the vehicle according to an embodiment of the present disclosure may generate a tracking acceleration for tracking the speed profile based on the target time point, the time points before and after the target time point, and the speed profile.

An embodiment of the present disclosure may reflect information on the speed profile with respect to the time points before and after the target time point in the tracking acceleration by reflecting the target time point and the time points before and after the target time point to generate the tracking acceleration.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A vehicle, comprising:
    a speed profile generating device configured to generate a speed profile indicating an expected speed change of a vehicle with respect to a unit time, based on a current driving state of the vehicle;
    a time point selecting device configured to select a target time point, a first time point earlier than the target time point, and a second time point later than the target time point from the speed profile;
    a tracking acceleration generating device configured to generate a tracking acceleration for tracking the speed profile based on the target time point, the first time point, the second time point, and the speed profile; and
    a controller module configured to control a driving state of the vehicle based on the tracking acceleration.

2. The vehicle of claim 1, wherein the speed profile generating device receives information about the current driving state at a predetermined period from the controller module.

3. The vehicle of claim 1, wherein the time point selecting device selects the target time point based on a response limit time for the tracking acceleration of the controller module.

4. The vehicle of claim 1, further comprising an error calculating device configured to calculate a target acceleration based on the target time point and the speed profile and generate an error value corresponding to a difference between a target acceleration profile where the vehicle accelerates at the target acceleration and the speed profile with respect to at least one time point in the unit time.

5. The vehicle of claim 4, wherein the time point selecting device selects a time point earlier than the target time point by a predetermined time as the first time point, and selects a time point later than the target time point by the predetermined time as the second time point.

6. The vehicle of claim 5, wherein the tracking acceleration generating device calculates a first acceleration based on the first time point and the speed profile, calculates a second acceleration based on the second time point and the speed profile, and calculates the tracking acceleration based on the target acceleration, the first acceleration, and the second acceleration.

7. The vehicle of claim 6, wherein the tracking acceleration generating device receives a first error value corresponding to the first time point and a second error value corresponding to the second time point from the error calculating device, reflects the first acceleration in the tracking acceleration when the first error value is greater than or equal to a predetermined ratio with respect to a current speed of the vehicle, and reflects the second acceleration in the tracking acceleration when the second error value is greater than or equal to the predetermined ratio with respect to the current speed of the vehicle.

8. The vehicle of claim 4, wherein the time point selecting device selects a time point having a largest error value among time points earlier than the target time point as the first time point, and selects a time point having a largest error value among time points later than the target time point as the second time point.

9. The vehicle of claim 8, wherein the tracking acceleration generating device generates a first weight by dividing a time from a current time point to the first time point by a time from the current time point to the target time point, and generates a second weight by dividing a time from the target time point to the second time point by a time from the current time point to the second time point.

10. The vehicle of claim 9, wherein the tracking acceleration generating device calculates a first acceleration based on the first time point and the speed profile, calculates a second acceleration based on the second time point and the speed profile, and calculates the tracking acceleration based on the target acceleration, the first acceleration, and the second acceleration.

11. The vehicle of claim 10, wherein the tracking acceleration generating device reflects a value obtained by calculating the first weight at the first acceleration in the tracking acceleration when the first error value is greater than or equal to a predetermined ratio with respect to a current speed of the vehicle, and reflects a value obtained by calculating the second weight at the second acceleration in the tracking acceleration when the second error value is greater than or equal to the predetermined ratio with respect to the current speed of the vehicle.

12. A control method of a vehicle, the control method comprising:
    generating a speed profile indicating an expected speed change of a vehicle with respect to a unit time, based on a current driving state of the vehicle;
    selecting a target time point from the speed profile;
    selecting a first time point earlier than the target time and a second time point later than the target time point;
    generating a tracking acceleration for tracking the speed profile based on the target time point, the first time point, the second time point, a current time point, a current speed of the vehicle, and the speed profile; and
    controlling a driving state of the vehicle based on the tracking acceleration.

13. The control method of claim 12, further comprising transmitting and receiving information about the current driving state at a predetermined period.

14. The control method of claim 12, further comprising:
    calculating a target acceleration based on the target time point and the speed profile; and
    generating an error value corresponding to a difference between a target acceleration profile where the vehicle accelerates at the target acceleration, and the speed profile with respect to at least one time point in the unit time.

15. The control method of claim 14, wherein the selecting of the first time point and the second time point includes:
    selecting a time point earlier than the target time point by a predetermined time as the first time point; and
    selecting a time point later than the target time point by the predetermined time as the second time point.

16. The control method of claim 15, wherein the generating of the tracking acceleration includes:

calculating a first acceleration based on the first time point and the speed profile;

calculating a second acceleration based on the second time point and the speed profile; and calculating the tracking acceleration based on the target acceleration, the first acceleration, and the second acceleration.

17. The control method of claim 16, wherein the generating of the tracking acceleration includes:

receiving a first error value corresponding to the first time and a second error value corresponding to the second time point;

reflecting the first acceleration in the tracking acceleration, when the first error value is greater than or equal to a predetermined ratio with respect to a current speed of the vehicle; and reflecting the second acceleration in the tracking acceleration, when the second error value is greater than or equal to the predetermined ratio with respect to the current speed of the vehicle.

18. The control method of claim 14, wherein the selecting of the first time point and the second time point includes:

selecting a time point having a largest error value among time points earlier than the target time point as the first time point; and selecting a time point having a largest error value among time points later than the target time point as the second time point.

19. The control method of claim 18, wherein the generating of the tracking acceleration includes:

generating a first weight by dividing a time from a current time point to the first time point by a time from the current time point to the target time point; and generating a second weight by dividing a time from the target time point to the second time point by a time from the current time point to the second time point.

20. The control method of claim 19, wherein the generating of the tracking acceleration includes:

calculating a first acceleration based on the first time point and the speed profile;

calculating a second acceleration based on the second time point and the speed profile; and calculating the tracking acceleration based on the target acceleration, the first acceleration, and the second acceleration.

\* \* \* \* \*